United States Patent
Shimizu et al.

(10) Patent No.: US 8,696,408 B2
(45) Date of Patent: Apr. 15, 2014

(54) METHOD OF MANUFACTURING FORMED CUTTER AND GRINDING TOOL FOR FORMED CUTTER

(75) Inventors: Nobuo Shimizu, Tokyo (JP); Daisuke Tobari, Osaka (JP); Akiteru Asai, Osaka (JP)

(73) Assignees: Mitsubishi Heavy Industries, Ltd., Tokyo (JP); New Kenma Kiko Co., Ltd., Osaka (JP)

( * ) Notice: Subject to any disclaimer, the term of this patent is extended or adjusted under 35 U.S.C. 154(b) by 433 days.

(21) Appl. No.: 13/034,015

(22) Filed: Feb. 24, 2011

(65) Prior Publication Data
US 2011/0312253 A1 Dec. 22, 2011

(30) Foreign Application Priority Data
Jun. 17, 2010 (JP) .................................. 2010-138038

(51) Int. Cl.
*B24B 1/00* (2006.01)
(52) U.S. Cl.
USPC .................... 451/45; 451/48; 451/47; 451/57; 451/141; 451/540
(58) Field of Classification Search
USPC .................... 451/45, 48, 58, 47, 141, 540; 409/131–132, 143
See application file for complete search history.

(56) References Cited

U.S. PATENT DOCUMENTS

| | | | | | |
|---|---|---|---|---|---|
| 2,142,285 | A | * | 1/1939 | Pelphrey | 451/48 |
| 2,889,669 | A | * | 6/1959 | Babbitt | 451/48 |
| 3,483,605 | A | * | 12/1969 | Fabish | 407/54 |
| 3,863,525 | A | * | 2/1975 | Cale | 76/107.1 |
| 4,546,575 | A | * | 10/1985 | Adams | 451/24 |
| 5,833,402 | A | * | 11/1998 | Martin | 407/54 |
| 5,868,606 | A | * | 2/1999 | Martin | 451/48 |
| 5,944,460 | A | * | 8/1999 | Gill | 408/204 |
| 6,688,817 | B2 | * | 2/2004 | Borschert et al. | 408/230 |

(Continued)

FOREIGN PATENT DOCUMENTS

| | | | | |
|---|---|---|---|---|
| EP | | 260026 A2 * | 3/1988 | B23B 31/04 |
| JP | | 2000-308971 | 11/2000 | |

(Continued)

OTHER PUBLICATIONS

International Search Report issued May 17, 2011 in corresponding International (PCT) Application No. PCT/JP2011/053540 with English translation.

(Continued)

*Primary Examiner* — George Nguyen
(74) *Attorney, Agent, or Firm* — Wenderoth, Lind & Ponack, L.L.P.

(57) ABSTRACT

A formed cutter 1 has on its tip side a blade 2 having a spiral cutting part 6 and a spiral flute 8 alternately disposed and rotating around a rotation axis O to perform cutting. The formed cutter 1 is manufactured by forming a depression 6B and a projection 6A with different diameters on a blade forming part 12, forming the spiral flute 8 on the blade forming part 12, and forming a rake face 4 on a side fall of the spiral flute 8 by bringing the grinding tool 18 in line contact with the side wall of the spiral flute 8 along a depth direction of the flute 8 while rotating the grinding tool 18 around its axial center.

14 Claims, 8 Drawing Sheets

(56) References Cited

U.S. PATENT DOCUMENTS

| | | | |
|---|---|---|---|
| 2003/0039547 A1* | 2/2003 | Bourgy et al. | 416/1 |
| 2004/0198197 A1* | 10/2004 | Schwartz et al. | 451/61 |
| 2007/0232202 A1 | 10/2007 | Schneeberger | |
| 2008/0152445 A1* | 6/2008 | Jensen et al. | 408/145 |
| 2009/0182449 A1* | 7/2009 | Frei et al. | 700/159 |

FOREIGN PATENT DOCUMENTS

| | | | |
|---|---|---|---|
| JP | 2001-170869 | 6/2001 | |
| JP | 2002036020 A * | 2/2002 | B23C 3/18 |
| JP | 2002-337017 | 11/2002 | |
| JP | 2003120203 A * | 4/2003 | F01D 5/14 |
| JP | 2007-245277 | 9/2007 | |
| JP | 2007-245337 | 9/2007 | |
| JP | 2007-276010 | 10/2007 | |

OTHER PUBLICATIONS

International Preliminary Report on Patentability and Written Opinion of the International Searching Authority issued Jan. 24, 2013 in International (PCT) Application No. PCT/JP2011/053540 with English translation.

* cited by examiner

METHOD OF MANUFACTURING FORMED CUTTER AND GRINDING TOOL FOR FORMED CUTTER

TECHNICAL FIELD

The present invention relates to a method for manufacturing a formed cutter and a grinding tool for the formed cutter, in particular, a method for manufacturing a formed cutter used for forming a complicated shape on an object to be ground and a grinding tool used for forming a rake face of the formed cutter.

BACKGROUND ART

Conventionally, a formed cutter is used to form a complicated shape on an object to be cut. For instance, a stator blade used in a steam turbine, a gas turbine, a compressor or the like, has a complicated shape such as a shape of a Christmas tree at a root part thereof. Normally, the root part is formed into the complicated shape by cutting work by means of the formed cutter.

For instance, Patent Document 1 (JP2007-245277A) discloses a formed cutter for forming a complicated shape such as a Christmas-tree shape on an object to be cut by rotating a blade tapering toward the blade tip around its rotation axis. The blade of the formed cutter has depressions and projections that have different tool diameters. The depressions and the projections are alternately disposed along the direction of the rotation axis. The flutes are formed between adjacent pair of cutting parts to positively discharge grinding swarf. The flutes become larger in width toward the tip side of the tool.

The rake face of the blade of the formed cutter is normally formed by grinding by means of a disk grinder.

Figure 7:
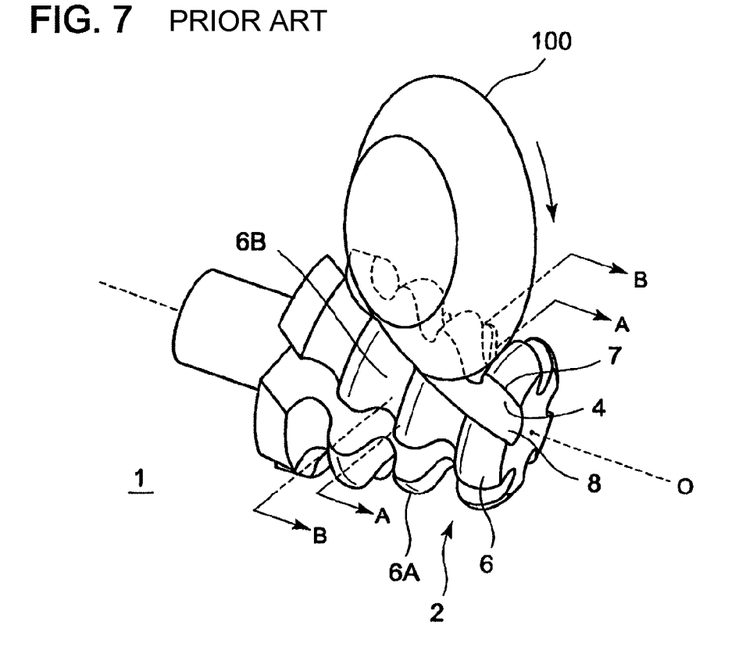
FIG. 7 shows a perspective view of a disk grinder grinding the rake face of the formed cutter.

FIG. 7 is a perspective view showing the disk grinder grinding the rake face of the formed cutter. As shown in FIG. 7, the disk grinder 100 rotates in a direction of an arrow to grid the rake face 4 of the blade 2 which is disposed on the tip side of the formed cutter.

The formed cutter 1 with the rake faces 4 rotates around the rotation axis O in a feed motion to process a surface of an object (object to be cut) by means of a cutting part 6. The helical tooth shown in FIG. 7 is normally used as the cutting part 6 of the formed cutter 1. This is to distribute stress generated during the cutting process. The flutes are formed between the adjacent pair of the cutting parts 6. The flutes are commonly formed by the disk grinder 100 as well.

Although it is not a formed cutter, Patent Document 2 (JP2007-245337A) discloses a double-cone grinding wheel as a grinding wheel for grinding general cutting tools. The double-cone grinding wheel is formed as a peripheral ridge with roof sides converging toward it.

RELATED ART

Patent Document

[PATENT DOCUMENT 1] JP2007-245277A
[PATENT DOCUMENT 2] JP2007-245337A

SUMMARY OF INVENTION

To form the rake face 4 of the flute 8 twisted with respect to the rotation axis by means of the disk grinder 100 as shown in FIG. 7, the disk grinder 100 grinds the rake surface 4 in plane-to-plane contact with the rake face 4 in such a state that the disk grinder 100 is tilted with respect to the rotation axis according to the flute 8. Thus, it is difficult to process the rake face 4 of the flute 8 with high flexibility and the rake face 4 obtained in the above manner has a curve shape that curves in the depth direction of the flute 8 (curved shape that curves continuously from the bottom surface of the flute 8 to the cutting edge 7 side). Accordingly, the rake angle of the cutting part 6 tends to be smaller at the position with small diameter of the blade 2 than at the position with large diameter of the blade 2. Specifically, even if the rake angle at the projection 6A of the cutting part 6 is positive, the rake angle at the depression 6B is negative.

Figure 8A:
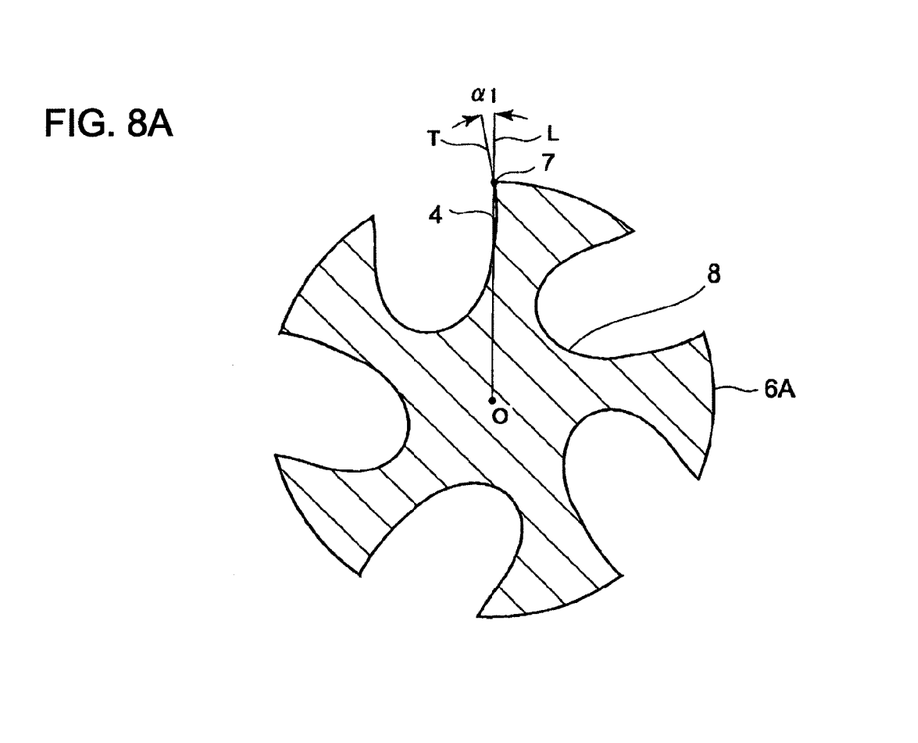
FIG. 8A is a sectional view taken along the line A-A of FIG. 7 to show a cross-sectional shape of the cutting part at the projection.
Figure 8B:
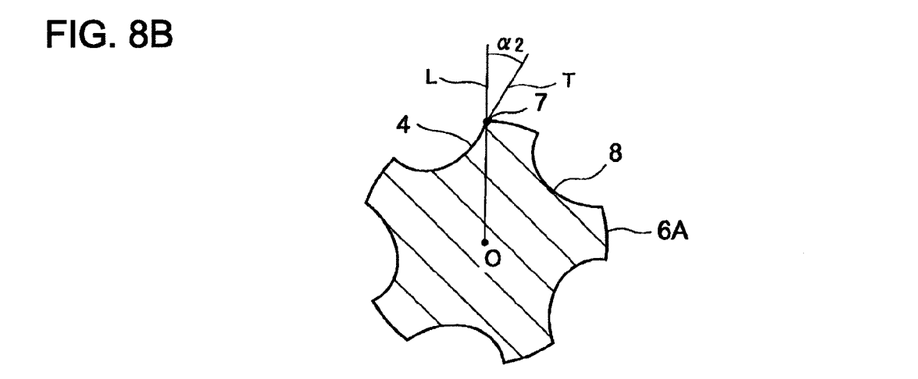
FIG. 8B is a sectional view taken along the line B-B of FIG. 7 to show a cross-sectional shape of the cutting part at the depression.

FIG. 8A and FIG. 8B show cross sections of the formed cutter 1. FIG. 8A is a sectional view taken along the line A-A of FIG. 7 to show a cross-sectional shape of the cutting part 6 at the projection 6A. FIG. 8B is a sectional view taken along the line B-B of FIG. 7 to show a cross-sectional shape of the cutting part 6 at the depression 6B. FIG. 8A shows that the rake angle $\alpha 1$ at the projection 6A of the cutting part is positive while the rake angle $\alpha 2$ at the depression 6B of the cutting part 6 is negative. The angle formed between a tangent line T of the rake face 4 at the cutting edge 7 and a straight line L from the rotation axis O to the cutting edge 7, is referred to as the rake angle.

When the rake angle $\alpha 2$ is negative at the depression 6B of the cutting part 6, the cutting capability of the depression 6B is low and also it is necessary to change the entire formed cutter 1 whenever the depression 6B wears out. The depression 6B wears out before the projection 6A. This is an issue in view of a running cost.

In contrast, in such a case that the cutting part 6 of the formed cutter 1 is straight and parallel with respect to the rotation axis O, the rake face is formed into a flat face by bringing the disk grinder 100 in plane-to-plane contact with the rake face 4. However, the position with a large diameter of the blade 2 (the projection 6A) and the position with a small diameter of the blade forming part 2 (the depression 6B) have different angles of the straight lines L from the rotation axis O to the cutting edge 7. Accordingly, the rake angles vary although the rake face 4 is flat. In view of this, it is desired to develop a method which has a high flexibility of processing the rake face and is capable of arbitrarily setting the rake angle regardless of the shape of the cutting part 6 of the formed cutter 1 (spiral or straight cutting part).

As described above, the disk grinder 100 is brought into plane-to-plane contact with the rake face 4 of the flute 8 in such a state that the disk grinder 100 is tilted with respect to the rotation axis O according to the flute. The rear surface of the disk grinder 100 interferes with the contiguous cutting part 6. To avoid this, the width of the flute is inevitably designed wider than necessary. This results in making the blade forming part 2 wider as well (making the diameter greater), which raises the cost of materials for an amount corresponding to the reduced width of the flute.

The grinding surface of the disk grinder 100 may be optimized into a complicated curved shape to achieve a desired value of the rake angle at both the projection 6A and the depression 6B of the cutting part 6 with use of input parameters such as the rake angle of the flute 8. However, in this method, it is necessary to provide a number of disk grinders 100 for a variety of formed cutters 1 of different shapes so that each disk grinder has an optimal curved shape for a corresponding formed cutter 1. This is high-cost and does not solve the interference of the rear surface of the disk grinder 100 with the contiguous cutting part 6. Thus, it is still necessary to design the flute wider than necessary.

In view of the problems above, an object of the present invention is to provide a method of manufacturing a formed cutter and a grinding tool for the formed cutter that have a high flexibility of processing a rake face, is capable of setting a rake angle arbitrarily and preventing the interference between the contiguous cutting part and the grinding tool.

The present invention provides a method for manufacturing a formed cutter having a blade on a tip side of the formed cutter, the blade having a cutting part and a flute alternately disposed and rotating around a rotation axis to perform cutting. The method may include, but is not limited to, the steps of: forming a depression and a projection on a blade forming part, the depression and the projection having different diameters and being arranged in a direction of the rotation axis; forming the flute on the blade forming part; and forming a rake face on a side fall of the flute by bringing the grinding tool in line contact with the side wall of the flute along a depth direction of the flute while rotating the grinding tool around an axial center of the grinding tool.

Herein, "bringing the grinding tool in line contact with the side wall of the flute" means that the grinding tool and the side wall of the flute (the rake face) are in line contact at least in a finishing stage of grinding the rake face. The grinding tool and the side wall of the flute (the rake face) are not necessarily in line contact from an initial stage through the finishing stage of grinding. Being "in line contact" along the depth direction of the flute means that the length of the contact area of the grinding tool with the side wall of the flute, is sufficiently greater than its width.

In the method, the rake face is formed on the side wall of the flute by bringing the grinding tool in line contact with the side wall of the flute along the depth direction of the flute while rotating the grinding tool around the axial center of the grinding tool. As a result, it is possible to improve the flexibility of processing the rake face and to arbitrarily set the rake angle.

To perform grinding, the grinding tool is brought into line contact with the side wall of the flute. As a result, it is possible to prevent the grinding tool from interfering with the contiguous cutting part. Therefore, it is no longer needed to design the flute width wider than necessary, resulting in reducing the diameter of the blade itself for the amount of the reduced width of the flute.

In the method for manufacturing the formed cutter, it is preferable that the grinding tool has a pencil shape, and that, in the step of forming the rake face, the pencil-shaped grinding tool is moved relative to the blade forming part along the flute in such a state that the pencil-shaped grinding tool rotates around the axial center of the grinding tool in line contact with the side wall of the flute.

The pencil-shaped grinding tool is moved relative to the blade forming part along the flute while being in line contact with the side wall of the flute. Thus, it is possible to form the rake face with a desired rake angle over the entire length of the flute.

Herein, "a pencil shape" indicates a rod shape formed by a trajectory of a profile of a symmetric shape when the symmetric shape with respect to its axial center turns around its axis. The pencil shape may be a cylindrical shape, a circular truncated cone shape, a combination of a cylinder and a circular truncated cone or the like.

In such case, it is preferable that a cross section of the pencil-shaped grinding tool passing through the axial center has a contour such that, when a reversed shape of the contour is transferred to the side wall of the flute, an angle between a tangent line of the side wall at a point on the side wall and a straight line from the rotation axis to the point on the side wall is constant regardless of a position of the point in the depth direction of the flute.

The cross section of the pencil-shaped grinding tool is determined by using the point group. As a result, it is possible to make the rake angles approximately a constant value at the position with large diameter and the position with the small diameter of the blade.

Alternatively, the cross section of the pencil-shaped grinding tool passing through the axial center may have a contour such that, when a reversed shape of the contour is transferred to the side wall of the flute, an angle between a tangent line of the side wall at a point on the side wall and a straight line from the rotation axis to the point on the side wall becomes smaller from a bottom of the flute toward a cutting edge of the cutting part.

There is a difference in circumferential speed between the position of the blade with large diameter (the projection 6A) and the position with small diameter (the depression 6B). This generates a difference in cutting capability between the positions. Thus, the angle between the straight line from the rotation axis O to a point and the tangent line at the point on the rake face is set to become smaller from the bottom of the flute toward the cutting edge of the cutting part. The rake angle at the position of the blade with large diameter is set comparatively small while the rake angle at the position with small diameter is set comparatively large. As a result, the cutting performance of the blade can be uniformed.

In the case of using the pencil-shaped grinding tool which has the cross-sectional contour set as described above, it is preferable, in the step of forming the rake face, the grinding tool is moved in accordance with a profile of a bottom of the flute in a direction perpendicular to the relative moving direction of the grinding tool to the blade forming part.

With use of the pencil-shaped grinding tool which has the cross-section contour set to achieve a desired rake angle, when the profile of the bottom of the flute has a taper shape or a shape with depressions and projections instead of a straight shape (the bottom of the flute has a constant diameter), the effect of the profile of the bottom of the flute disrupts the relationship between the point group defining the rake face and the rotation axis (center of the formed cutter). This generates difference in the rake angles.

The difference of the rake angle generated due to the profile of the bottom of the flute can be corrected by moving the grinding tool in accordance with the profile of the bottom of the flute.

Alternatively, the pencil-shaped grinding tool may have a cylindrical shape with a constant diameter, and in the step of forming the rake face, the pencil-shaped grinding tool may be moved in accordance with a profile of a cutting edge of the cutting part in a direction perpendicular to the relative moving direction of the grinding tool to the blade forming part.

The grinding tool which has a cylindrical shape with a constant diameter is moved in accordance with the profile of the cutting edge so that the rake angles at the position with large diameter and at the position with small diameter can be set freely. In this manner, it is possible to achieve the desired rake angle even in the case of using the grinding tool of simple cylindrical shape, by adjusting the cross-sectional contour of the grinding tool. Specifically, the rake angles at the position with large diameter (the projection) and at the position with small diameter (the depression) can be set respectively and freely for a variety of formed cutters with different shapes by means of an inexpensive grinding tool that is not particularly formed.

In the above method of manufacturing the formed cutter, it is preferable that a base material of the pencil-shaped grinding tool is made of quenched high-speed steel.

The disk grinder used in a conventional method of forming the rake face uses a base material made of aluminum alloy or the like from the perspective of reduction in weight. However, when the grinding tool has a pencil shape, the grinding tool becomes deformed by friction of the grinding. This may complicate the forming of the rake face with high precision. Thus, the base material of the pencil-shaped grinding tool is preferably made of quenched high-speed steel to enhance the rigidity of the grinding tool and to process the rake face with high precision.

In the above method of manufacturing the formed cutter, it is preferable that, in the step of forming the flute, the flute is formed by cutting the blade forming part by means of an endmill.

By means of the endmill, the flute can be easily formed with a minimum width to discharge grinding swarf produced in the cutting process. As described above, the grinding tool is brought into a line contact with the side wall of the flute instead of plane-to-plane contact. The narrow flute is formed by the endmill without causing interference between the contiguous cutting part and the grinding tool.

To cut the flute, the endmill is moved in the direction of its axial center. By this, the depressions and projections are formed on the bottom of the spiral flute. Thus, for instance, by processing the bottom of the flute to have depressions and projection in accordance with the profile of the cutting edge, the distance between the bottom of the flute to the cutting edge (depth of the flute) becomes constant. As a result, the rigidity at the position with large diameter of the blade (the projection) and the position with small diameter can be enhanced in a uniform manner.

In the above method of manufacturing the formed cutter, it is also preferable that the flute is a spiral flute twisted with respect to the rotation axis.

To form the spiral flute, in the conventional grinding method by the disk grinder, the issues such as the interference of the grinding tool with the contiguous cutting part and poor flexibility of processing the rake face become evident. In contrast, in the method of manufacturing the formed cutter described above, the flexibility of forming the rake face is high and the rake angle can be arbitrarily set while preventing the interference of the grinding tool with the contiguous spiral cutting part.

As one aspect of the present invention, proposed is a grinding tool for forming a rake face of a formed cutter having a blade on a tip side of the formed cutter. The blade has a cutting part and a flute alternately disposed and rotating around a rotation axis to perform cutting. The grinding tool has a pencil shape in which a cross section of the pencil-shaped grinding tool passing through the axial center has a contour such that, when a reversed shape of the contour is transferred to a side wall of the flute, an angle between a tangent line of the side wall at a point on the side wall and a straight line from the rotation axis to the point on the side wall is constant regardless of a position of the point in a depth direction of the flute.

The rake face is ground on the flute of the formed cutter by means of the grinding tool by bringing the grinding tool in line contact with the side wall of the flute along the depth direction of the flute while the grinding tool is rotated.

In this manner, the rake face is formed on the side wall of the flute by bringing the grinding tool in line contact, instead of plane-to-plane contact, with the side wall of the flute along the depth direction of the flute while rotating the grinding tool around an axial center of the grinding tool. As a result, it is possible to improve the flexibility of processing the rake face and to set the rake angle arbitrarily.

To perform grinding, the grinding tool is brought into line contact with the side wall of the flute. As a result, it is possible to prevent the grinding tool from interfering with the contiguous cutting part. Therefore, it is no longer needed to design the flute width wider than necessary, resulting in reducing the diameter of the blade itself for the amount of the reduced width of the flute.

Further, the cross section of the pencil-shaped grinding tool is determined by using the point group. As a result, it is possible to make the rake angles at the position with large diameter and the position with the small diameter of the blade close to a constant value.

As another aspect of the present invention, proposed is a grinding tool for forming a rake face of a formed cutter having a blade on a tip side of the formed cutter. The blade has a cutting part and a flute alternately disposed and rotating around a rotation axis to perform cutting. The grinding tool has a pencil shape in which a cross section of the pencil-shaped grinding tool passing through the axial center has a contour such that, when a reversed shape of the contour is transferred to a side wall of the flute, an angle between a tangent line of the side wall at a point on the side wall and a straight line from the rotation axis to the point on the side wall becomes smaller from a bottom of the flute toward a cutting edge of the cutting part.

The rake face is ground on the flute of the formed cutter by means of the grinding tool by bringing the grinding tool in line contact with the side wall of the flute along the depth direction of the flute while the grinding tool is rotated.

In this manner, the rake face is formed on the side wall of the flute by bringing the grinding tool in line contact, instead of plane-to-plane contact, with the side wall of the flute along the depth direction of the flute while rotating the grinding tool around an axial center of the grinding tool. As a result, it is possible to improve the flexibility of processing the rake face and to set the rake angle arbitrarily.

To perform grinding, the grinding tool is brought into line contact with the side wall of the flute. As a result, it is possible to prevent the grinding tool from interfering with the contiguous blade. Therefore, it is no longer needed to design the flute width wider than necessary, resulting in reducing the diameter of the blade itself for the amount of the reduced width of the flute.

As described above, the cross section of the pencil-shaped grinding tool passing through the axial center has a contour such that the angle between the tangent line of the side wall at a point on the side wall and the straight line from the rotation axis to the point on the side wall becomes smaller from the bottom of the flute toward the cutting edge of the cutting part. As a result, it is possible to uniform the cutting capability of the blade at the position with large diameter and at the position with small diameter of the blade that have different circumferential speeds.

In the above grinding tool for the formed cutter, it is preferable that a base material of the pencil-shaped grinding tool is made of quenched high-speed steel.

According to the present invention, the rake face is ground on the flute of the formed cutter by means of the grinding tool by bringing the grinding tool in line contact with the side wall of the flute along the depth direction of the flute while the grinding tool is rotated. As a result, it is possible to improve the flexibility of processing the rake face and to set the rake angle arbitrarily.

To perform grinding, the grinding tool is brought into line contact with the side wall of the flute instead of plane-to-plane contact. As a result, it is possible to prevent the grinding tool from interfering with the contiguous cutting part.

BRIEF DESCRIPTION OF DRAWINGS

FIG. 3A and FIG. 3B are sectional views of a blade forming part in which rake faces are formed.

FIG. 8A and FIG. 8B show cross sections of the blade.

DESCRIPTION OF EMBODIMENTS

A preferred embodiment of the present invention will now be described in detail with reference to the accompanying drawings. It is intended, however, that unless particularly specified, dimensions, materials, shape, its relative positions and the like shall be interpreted as illustrative only and not limitative of the scope of the present invention.

FIG. 1A through FIG. 1D illustrate an exemplary process of manufacturing a formed cutter in relation to a preferred embodiment.

Figure 1A:
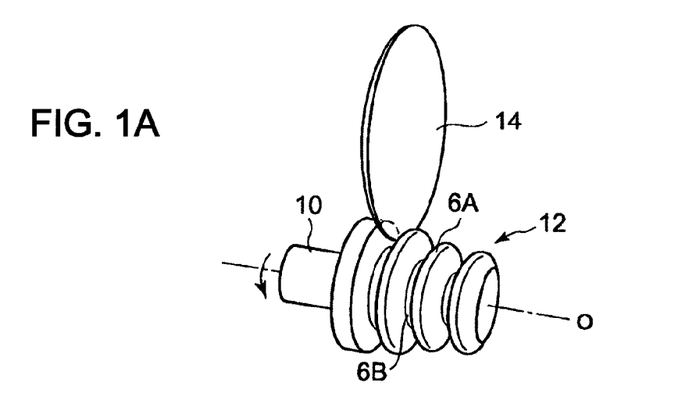
FIG. 1A through FIG. 1D illustrate an exemplary process of manufacturing a formed cutter in relation to a preferred embodiment.

As FIG. 1A shows, a shank 10 is installed on a blade 12 and the blade 12 is mounted on a turning machine. While the turning machine turns the blade forming part 12, a grind stone 14 of a disk shape grinds the blade 12. During the grinding process, projections 6A and depressions 6B are formed on the blade forming part 12 in a direction of the rotation axis. The projections 6A and the depressions 6B have different diameters. Size and positions of the projections 6A and the depressions 6B are set according to a shape of the formed cutter to be obtained as an end product.

During the grinding process, the projections 6A and the depressions 6B are roughly ground. The precision forming of the projections 6A and the depressions 6B is preferably performed in a later step, i.e. a step of forming a cutting part (see FIG. 1D). By this, it is possible to form a rough shape of the projections 6A and the depressions 6B in a speedy manner by means of the grind stone 14.

The exemplary case where the grind stone 14 of a disk shape grinds the blade 12 while the turning machine turns the blade forming part 12 is explained so far. However, a method of forming the projections 6A and the depressions 6B is not limited to this. For instance, a tool bit can be used to form the projections 6A and the depressions 6B. Alternatively, an arbitrary machine tool including a machining center may be used instead of the turning machine.

Figure 1B:
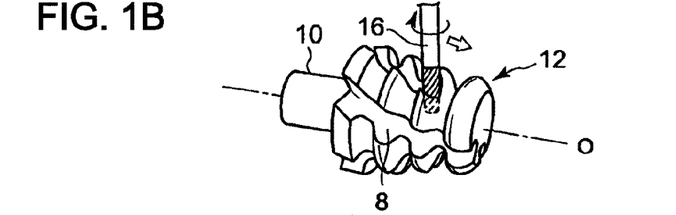

As FIG. 1B shows, with use of the a milling machine, an endmill 16 cuts the spiral flute 8 on the blade forming part 12 with a prescribed twist angle with respect to the rotation axis 0. The thick arrow in FIG. 1B indicates the relative moving direction of the blade forming part to the endmill 16 when the endmill 16 is used to cut the flute 8.

Specifically, the blade forming part 12 is fixed to a table of the milling machine. The table is moved while rotating the endmill 16 around its axial center to cause relative movement of the endmill 16 to the blade forming part 12, thereby forming the spiral flute 8. The shape such as width and depth and the size of the flute 8 is set according to the shape of the formed cutter to be obtained as an end product.

The spiral flute 8 is obtained by means of the endmill 16. Thus, the flute 8 with a minimum width to discharge grinding swarf produced during the cutting of the flute 8 can be easily formed. In the preferred embodiment, when cutting the rake face 4, the grinding tool is brought into a line contact with the side wall of the spiral flute instead of plane-to-plane contact. The narrow spiral flute 8 is cut by the endmill 16 without causing interference between the adjacent spiral cutting part 6 and the grinding tool.

When the endmill 16 performs the cutting, the endmill 16 may be moved in the direction of the axial center (upward and downward movement). This allows the endmill 16 to form depressions and projections on the bottom of the spiral flute.

Figure 2:
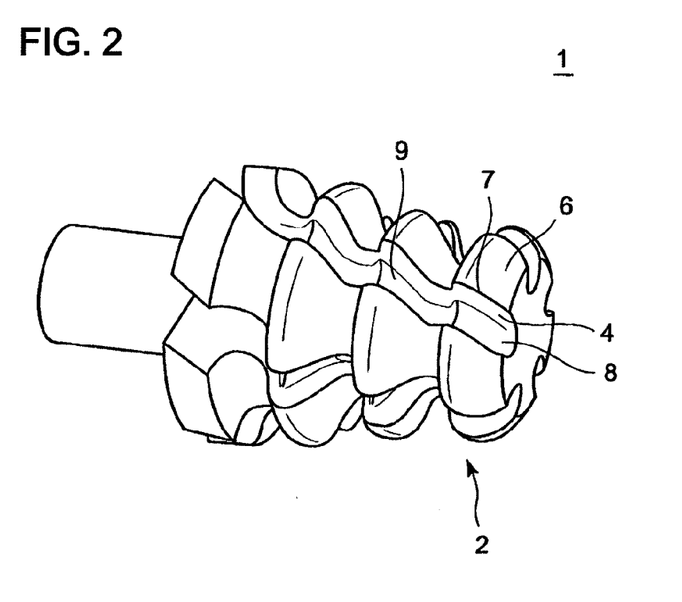
FIG. 2 is a perspective view showing exemplary structure of a formed cutter having depressions and projections formed on a bottom part of a spiral flute.

FIG. 2 is a perspective view showing exemplary structure of the formed cutter having depressions and projections formed on the bottom of a spiral flute 8. As FIG. 2 shows, depressions and projections are formed on the bottom 9 of the spiral flute 8 in accordance with the profile of the cutting edge 7. The distance between the bottom 9 and the cutting edge 7 (the depth of the spiral flute 8) is approximately constant. This evenly improves the rigidity of the blade 2 at a position with a large diameter (the projection 6A) and at a position with a small diameter (the depression 6B).

The exemplary case of the endmill 16 forming the spiral flute 8 by means of the milling machine is explained above. However, a method of forming the spiral flute 8 is not limited to this. For instance, the disk grinder may be used or a machine tool including a machining center may be used instead of the turning machine.

Figure 1C:
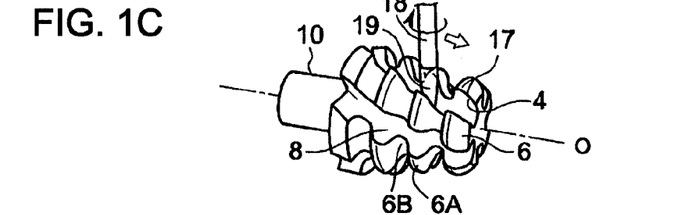

Next, as shown in FIG. 1C, the grinding tool is brought into a line contact with the side wall of the spiral flute 8 along the dept direction of the spiral flute 8 while the grinding tool 18 rotates around the axial center by means of the grinding machine, thereby forming the rake face 4 on the side wall of the spiral flute. The thick arrow in FIG. 1C indicates the relative movement of the grinding tool 18 to the blade forming part 12 in the process of grinding by means of the grinding tool 18.

Specifically, the blade forming part 12 is fixed to a table of the grinding machine. The table is moved while rotating the grinding tool 18 around its axial center so as to cause the relative movement of the grinding tool 18 to the blade forming part 12, thereby forming the rake face 4. The grinding tool has a grinding face including abrasive grains on the outer circumference on the tip side of the grinding tool 18. The grinding face 18 grinds the rake face 4 as well as smoothing the rake face 4.

The exemplary case of the grinding tool 18 forming the rake face 4 on the side wall of the spiral flute 8 by means of the grinding machine is explained. However, a method of forming the rake face is not limited as long as being capable of bringing the grinding tool 18 in a line contact with the side wall of the spiral flute 8. For instance, a machine tool including a machining center or a grinding center may be used instead of the grinding machine.

As described above, while being rotated, the grinding tool 18 is brought into a line contact with the side wall of the spiral flute 8 along the depth direction of the spiral flute 8, thereby forming the rake face 4. This improves the flexibility of forming the rake face 4 and the rake angle of the projections 6A and the depressions 6B of the cutting part 6 can be set as desired.

Figure 3A:
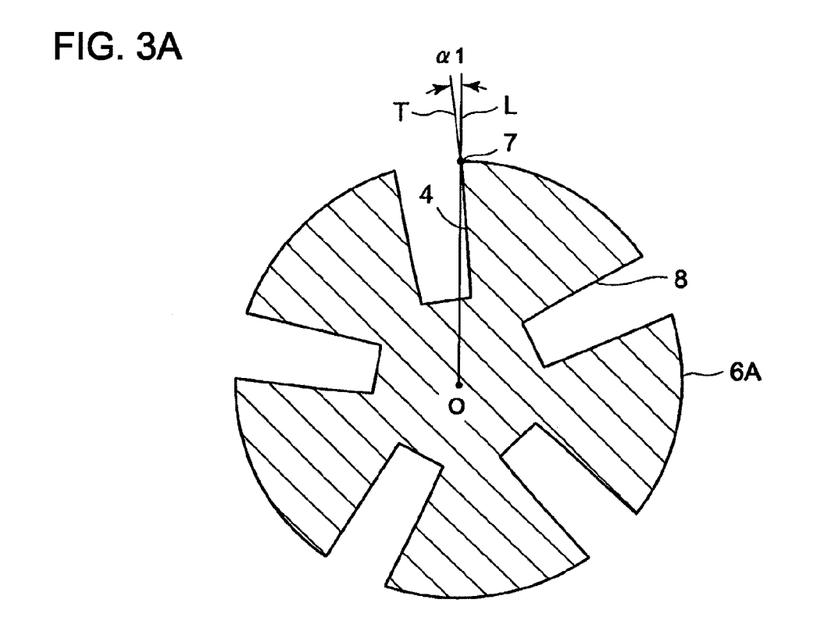
FIG. 3A shows a sectional view of the spiral cutting part taken at the projection and FIG. 3B shows a sectional view of the spiral cutting part taken at the depression.
Figure 3B:
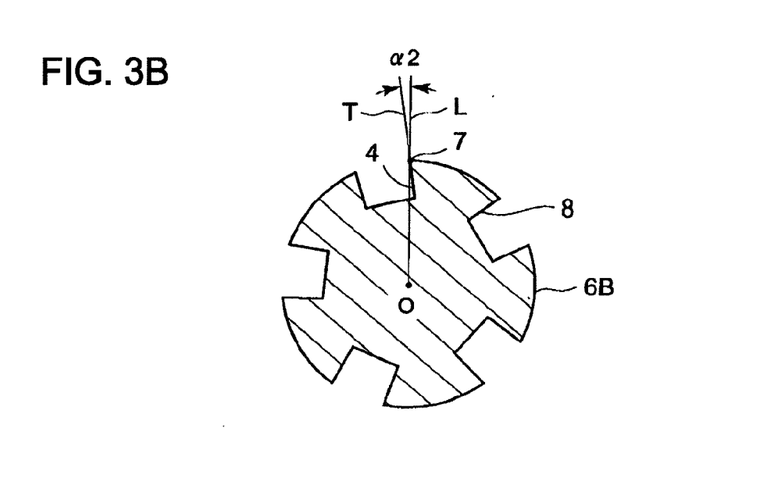

FIG. 3A and FIG. 3B are sectional views of the blade forming part 12 in which the rake faces 4 are formed by grinding of the grinding tool 18. FIG. 3A shows a sectional view of the spiral cutting part 6 taken at the projection 6A. FIG. 3B shows a sectional view of the spiral cutting part 6 taken at the depression 6B.

As shown in FIG. 3A and FIG. 3B, both a first rake angle α1 at the projection 6A and a second rake angle α2 at the depression 6B have positive values and are approximately the same. The rake angle herein indicates the angle formed between a tangent line T of the rake face 4 at the cutting edge 7 and a straight line L from the rotation axis to the cutting edge 7.

In view of arbitrarily setting the rake angle of the projections 6A and the depressions 6B of the spiral cutting part 6 in the entire length of the spiral flute 8, the grinding tool 18 may preferably have a pencil shape. The pencil shape of the grinding tool 18 is preferably a rod shape formed by a trajectory of a profile of a symmetric shape when the symmetrical shape with respect to its axial center turns around its axis. The pencil shape may be a cylindrical shape, a circular truncated cone shape, a combination of a cylinder and a circular truncated cone or the like. FIG. 1C shows an exemplary shape of the grinding tool 18 that has a pencil shape, i.e. a cylindrical shape gradually tapering toward the tip.

A cross section of the pencil-shaped grinding tool 18 passing through the axial center preferably has a contour such that, when a reversed shape of the contour is transferred to the side wall of the spiral flute 8, an angle between the tangent line of the side wall at a point on the side wall of the spiral flute and a straight line from the rotation axis O to the point on the side wall is constant regardless of a position of the point in the depth direction of the flute 8.

Figure 4:
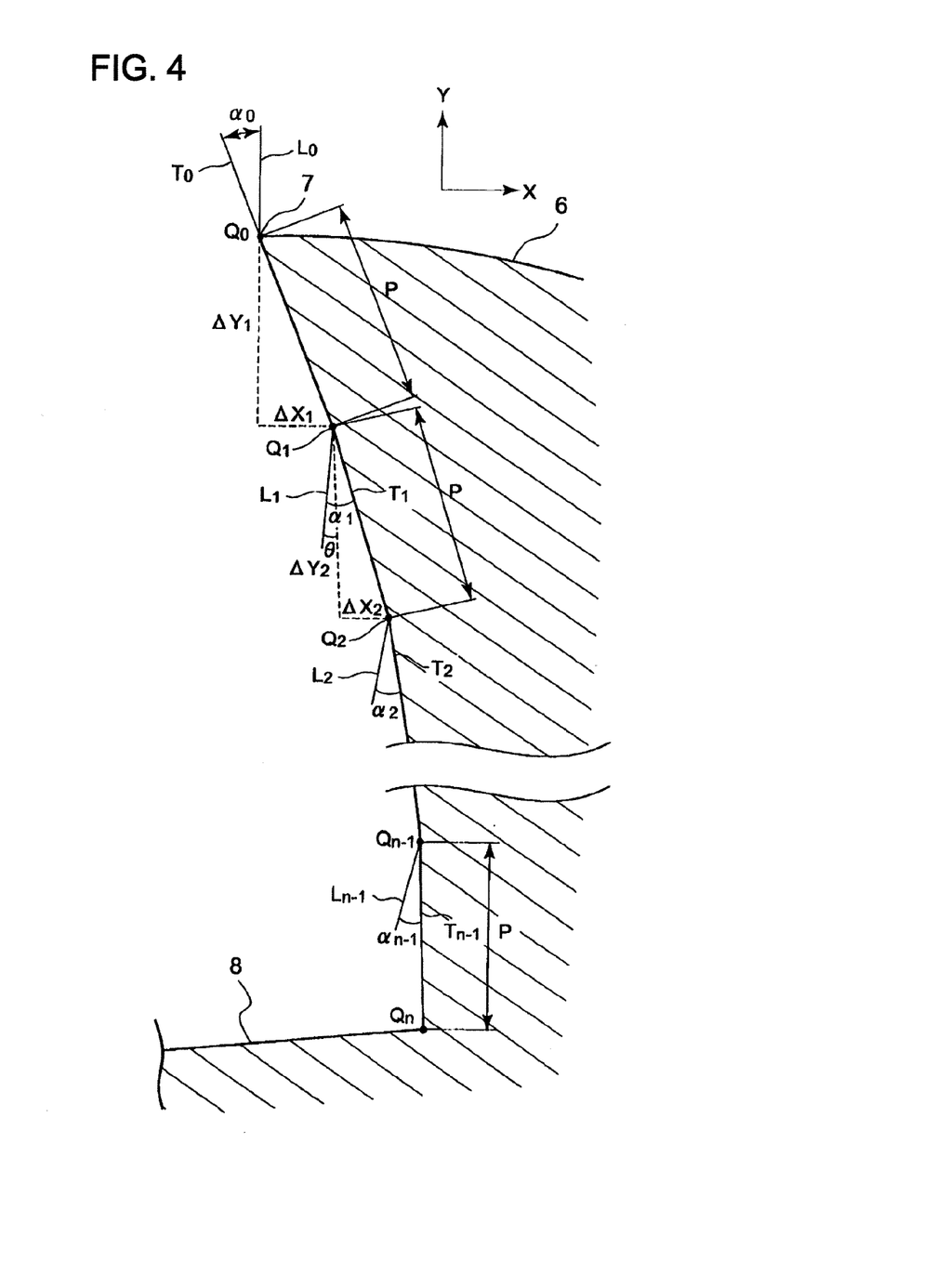
FIG. 4 is an enlarged sectional view of a side wall (rake face) of the spiral flute to which a reversed shape of a contour of a grinding tool is transferred.

FIG. 4 is an exemplary illustration used to explain how to determine the contour of the pencil-shaped grinding tool. FIG. 4 shows the side wall (the rake face 4) of the spiral flute 8 to which a reversed shape of the contour of the grinding tool 18 is transferred. For convenience in explaining, FIG. 4 shows a point group $Q_i$ ($i$=0 to n) as if the point group were on the side wall (the rake face 4) of the spiral flute 8. The point group $Q_i$ are used to set the contour of the cross section of the pencil-shaped grinding tool passing through the axial center. The point group $Q_i$ actually exist on the contour of the grinding tool 18 that is in contact with the side wall (the rake face 4) of the spiral flute 8.

The side wall (the rake face 4) of the spiral flute 8 in FIG. 4 has a reversed shape of the contour of the grinding tool 18. The contour of the grinding tool 18 is formed by connecting the ideal points $Q_i$ such that the angle between the tangent line of the side wall at a point on the side wall of the spiral flute 8 and the straight line from the rotation axis O to the point on the side wall is constant regardless of a position of the point in the depth direction of the spiral flute 8. Specifically, the angle $α_i$ between the straight line $T_i$ from the rotation axis O and the tangent line $L_i$ of the rake face 4 at each point is constant ($α_0=α_1=α_2=\ldots=α_{n-1}$). Under the conditions, the ideal points $Q_i$ which form the contour of the grinding tool 18 are calculated as follows.

First, the radius of the blade forming part 12 having the spiral cutting part 6 (tool radius) is set as R. The pitch between each point is set as P. When the coordinate of the point $Q_0$ corresponding to the cutting edge 7 of the cutting part has is (0, R), the coordinate ($X_1$, $Y_1$) of the next point $Q_1$ is represented by a formula 1 below.

$$X_1 = \Delta X_1 = \sin α_0 \times P$$

$$Y_1 = R - \Delta Y_1 = R - \cos α_0 \times P \quad \text{[FORMULA 1]}$$

The coordinate of the next point $Q_2$ ($X_2$, $Y_2$) is represented by a formula 2 below.

$$X_2 = X_1 + \Delta X_2 = \sin α_0 \times P + \sin(α_1 - θ) \times P$$

$$Y_2 = Y_1 - \Delta Y_2 = R - \cos α_0 \times P - \cos(α_1 - θ) \times P \quad \text{[FORMULA 2]}$$

In the formula 2, the angle θ can be obtained from $\tan θ = \Delta X_1/(R - \Delta Y_1)$.

In the similar manner, coordinates of the points $Q_3$ to $Q_{n-1}$ can be calculated. It is possible to construct the point group $Q_i$ constructed such that the angle $α_i$ is constant regardless of a position of the point in the depth direction of the spiral flute 8.

The point group $Q_i$ obtained in the above manner are connected to set the shape of the contour of the cross section of the grinding tool 18 passing through the axial center. By reducing a pitch P between each point, the contour of the grinding 18 obtained by connecting the point group $Q_i$ becomes smoother.

The contour of the pencil-shaped grinding tool 18 is set with use of the point group $Q_i$ as described above. By this, it is possible to make the rake angle at a position with a large diameter (the projection 6A) and the rake angle at a position with a small diameter (the depression 6B) closer to constant.

The disk grinder 100 (see FIG. 7) used in a conventional method of forming the rake face 4 use a base material made of aluminum alloy or the like from the perspective of reduction in weight. However, if the grinding tool has a pencil shape, the pencil-shaped grinding tool 18 becomes deformed by friction of the grinding. This may complicate the forming of the rake face 4 with high precision. Thus, the base material of the pencil-shaped grinding tool 18 is preferably made of quenched high-speed steel from the perspective of forming the rake face 4 with high precision as well as enhancing the rigidity of the grinding tool 18.

From the perspective of further improving the rigidity of the grinding tool 18, the diameter of the grinding tool 18 is preferably set as large as possible in the range that permits the grinding tool to be inserted in the spiral flute 8 smoothly without interfering with the adjacent cutting part 6

After forming the rake face 4 by grinding by means of the grinding tool 18, while a disk grinder 20 is rotated by a grinding machine, a rim of the disk grinder 20 is brought into contact with the outer surface of the spiral cutting part 6, thereby sharpening the spiral cutting part 6. The thick arrow in FIG. 1D indicates the relative moving direction of the disk grinder 20 to the blade forming part 12 during the grinding by means of the disk grinder 20.

Figure 1D:
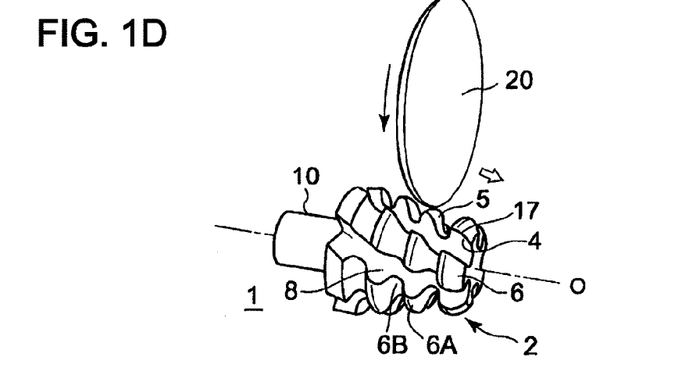

Specifically, the blade forming part 12 is fixed to a table of the grinding machine. The table is moved while rotating the disk grinder 20 to cause the relative movement of the disk grinder 20 to the blade forming part 12, thereby forming a flank face 5 in the spiral cutting part 6. In such case that the projections 6A and the depressions 6B of FIG. 1A are ground only roughly in the forming of the projections 6A and the depressions 6B, the disk grinder 20 precisely grinds the projections 6A and the depressions 6B in accordance with the shape of the formed cutter 1 to be obtained as an end product.

The exemplary case of using the disk grinder 20 to form the flank face 5 on the spiral cutting part 6 by means of the grinding machine is explained above. However, a method of forming the flank face 5 is not limited to this. For instance, an arbitrary machine tool including a machining center or a grinding center may be used instead of the grinding machine.

The formed cutter is manufactured in the manner shown in FIG. 1 through FIG. 1D. Finally, the formed cutter 1 having the blade 2 on which the spiral cutting parts and the spiral flutes are alternately disposed can be obtained. The blade 2 of the formed cutter 1 rotates around the rotation axis O to cut the object to be cut by the rake face 4 of the spiral cutting part 6.

As described above, in the method of manufacturing the formed cutter 1 in relation to the preferred embodiment, the formed cutter 1 has the blade 2 on the tip side of the formed cutter 1 and the blade 2 has the spiral cutting parts 6 and the spiral flutes 8 alternately disposed, and rotates around the rotation axis O to perform cutting. The method of manufacturing the cutter blade 1 in relation to the preferred embodiment includes a step of forming the projections 6A and the depressions 6B on the blade forming part 12, the projections 6A and the depressions 6B having different diameters and being arranged in a direction of the rotation axis O, a step of forming the spiral flutes 8 on the blade forming part 12 twisted with respect to the rotation axis O with the rake angle, and a step of forming the rake face 4 on the side fall of each spiral flute 8 by bringing the grinding tool 18 in line contact with the side wall of the spiral flute along the depth direction of the spiral flute 8 while rotating the grinding tool 18 around the axial center of the grinding tool 18.

In the preferred embodiment, the rake face 4 is formed on the side wall of the spiral flute 8 by bringing the grinding tool 18 in line contact with the side wall along the depth direction of the spiral flute 8 while rotating the grinding tool 18 around the axial center of the grinding tool 18. This enhances the freedom of forming the rake face 4 and allows the rake angle to be arbitrarily set.

Moreover, the grinding tool 18 is brought into a line contact with the side wall of the spiral flute 8 instead of plane-to-plane contact. This prevents the interference between the adjacent spiral cutting part 6 and the grinding tool 18. It is no longer necessary to design the spiral flute 8 wide beyond necessity. The narrow spiral flute 8 is formed by the grinding tool 18 without causing interference between the adjacent spiral cutting part 6 and the grinding tool 18 and thus, it is possible to reduce the diameter of the blade 2 for the corresponding amount.

While the present invention has been described with reference to exemplary embodiments, it is obvious to those skilled in the art that various changes may be made without departing from the scope of the invention.

For instance, in the preferred embodiment, the projections 6A and the depressions 6B are formed on the blade forming part 12, the spiral flutes 8 are formed in the blade forming part 12 and then, the rake faces 4 are formed on the side walls of the spiral flutes 8. However, it is not necessary to perform these steps in the order listed above. The order of performing the steps may be changed as desired.

In the preferred embodiments illustrated in FIG. 1A through FIG. 1D, the formed cutter 1 of a Christmas-tree shape is used as the exemplary case. In the formed cutter 1, the spiral cutting parts 6 and the spiral flutes 8 are formed in the blade 2 in a twisted manner with respect to the rotation axis O and the spiral cutting part 6 has four sets of the projection 6A and three sets of the depression 6B. However, the shape of the formed cutter 1 is not limited to this as long as it has at least one set of the projection 6A and the depression 6B. For instance, the formed cutter may have a straight-blade shape in which the cutting part 6 of the blade 2 is not twisted with respect to the rotation axis O. Hereinafter, the cutting part 6 and the flute 8 indicates the straight cutting part 6 and the straight flute 8 which are not twisted with respect to the rotation axis O as well as the spiral cutting part 6 and the spiral flute 8 which are twisted with respect to the rotation axis O.

In the preferred embodiment, the exemplary method of determining the contour of the pencil-shaped grinding tool 18 was explained in reference to FIG. 4. However, the method of determining the contour of the grinding tool 18 is not limited to this and a variety of methods can be used alternatively.

For instance, the contour of the cross section of the grinding tool 18 passing through the axial center may be set such that, when a reversed shape of the contour is transferred to the side wall of the flute 8 (the rake face 4), an angle between a tangent line of the side wall at a point on the side wall and a straight line from the rotation axis O to the point on the side wall becomes smaller from a bottom of the flute 8 toward the cutting edge 7 of the cutting part 6. Specifically, the angle $\alpha_i$ between the straight line $L_i$ from the rotation axis O to a point $Q_i$ and the tangent line $T_i$ at the point $Q_i$ on the rake face 4 becomes smaller from the bottom of the flute 8 toward the cutting edge 7 of the cutting part 6. This means that the following inequality is satisfied, $\alpha_0 < \alpha_1 < \alpha_2 < \ldots < \alpha_{n-1}$.

There is a difference in circumferential speed between the position of the blade 2 with large diameter (the projection 6A) and the position with small diameter (the depression 6B). This generates a difference in cutting capability between the positions. Thus, the angle $\alpha_i$ between the straight line $L_i$ from the rotation axis O to a point $Q_i$ and the tangent line $T_i$ at the point $Q_i$ on the rake face 4 is set to become smaller from the bottom of the flute 8 toward the cutting edge 7 of the cutting part 6. The rake angle at the position of the blade 2 with large diameter is set comparatively small while the rake angle at the position with small diameter is set comparatively large. As a result, the cutting capability of the blade 2 can be uniformed.

In the preferred embodiment, the moving path of the grinding tool during performing grinding is not specified. However, the grinding tool 18 may be moved in the direction perpendicular to the relative moving direction of the grinding tool 18 to the blade forming part 12, thereby grinding the blade forming part 12.

For instance, the grinding tool 18 may be moved in accordance with a profile of the bottom of the flute 8 in the direction perpendicular to the relative moving direction of the grinding tool 18 to the blade forming part 12.

When the contour of the cross section of the grinding tool 18 passing through the axial center is set such that the angle $\alpha_i$ between the tangent line $T_i$ of the side wall at a point on the side wall of the flute 8 and the straight line $L_i$ from the rotation axis O to the point is constant or becomes smaller from a bottom of the flute 8 toward the cutting edge 7 of the cutting part 6, i.e. when the contour of the grinding 18 is set so as to obtain a desired rake face 4, the effect of the profile of the bottom of the flute 8 disrupts the relationship between the point group defining the rake face 4 and the rotation axis O. This generates difference in the rake angles.

Figure 5A:
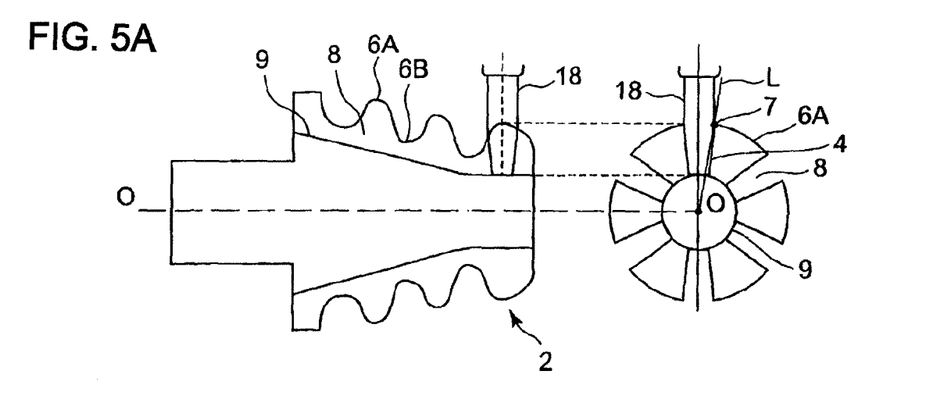
FIG. 5A, FIG. 5B and FIG. 5C are illustrations to explain the effects of the profile of the flute bottom on the rake angle.
Figure 5B:
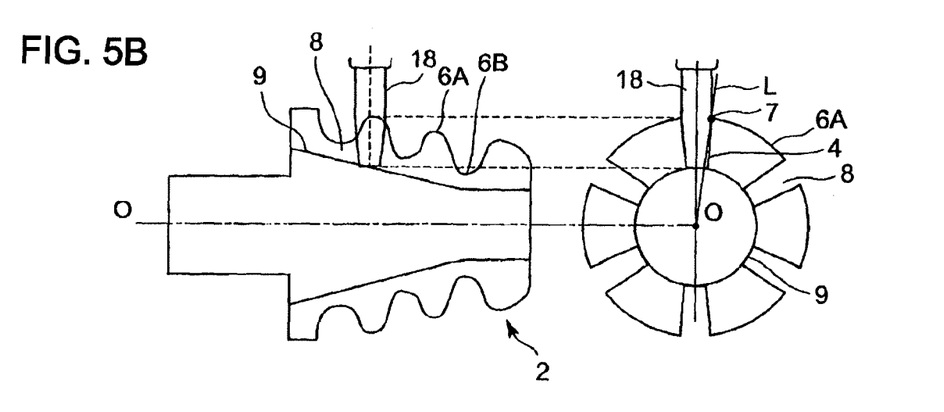
Figure 5C:
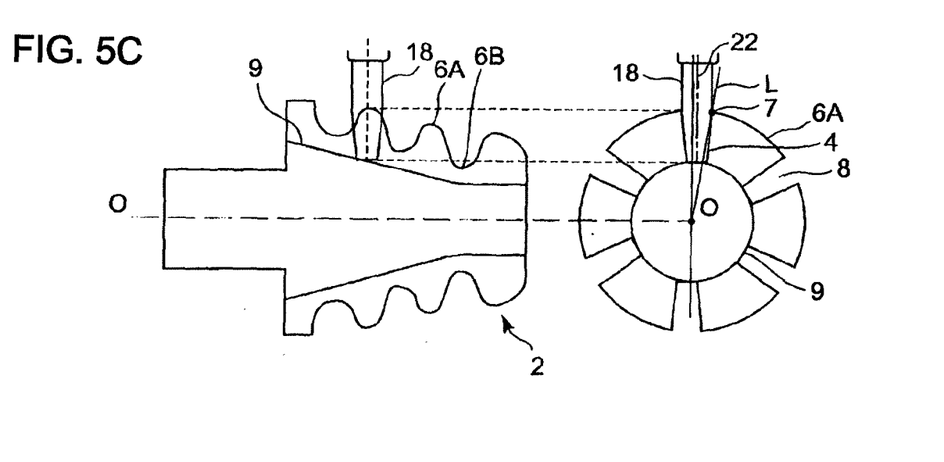

FIG. 5A, FIG. 5B and FIG. 5C are illustrations to explain the effects of the profile of the bottom of the flute 8 on the rake angle. In the case of the bottom 9 of the flute 8 having a taper shape, the depths of the flute 8 at the position on the tip side of the blade with small base diameter of the flute 8 (see FIG. 5A) and at the position on a root side of the blade 2 with large base diameter of the flute 8 (see FIG. 5B) are the same. Thus, the grinding tool 18 is in contact with the cutting edge 7 at the same point thereof and the tangent lines on the rake face 4 at the cutting edge are the same. However, the straight lines L from the rotation axis O to the cutting edge 7 have different angles at the positions of FIG. 5A and FIG. 5B. Accordingly, the angle (rake angle) formed between the tangent line T on the rake face 4 at the cutting edge 7 and the straight line L becomes different in response to the effect of the profile of the bottom 9 of the flute 8.

The difference of the rake angle generated due to the profile of the bottom 9 of the flute 8 can be corrected by moving the grinding tool 18 in the direction perpendicular to the relative moving direction of the grinding tool 18 to the blade forming part 12 (displacing the axial center 22) in accordance with the profile of the bottom 9 of the flute 8 as shown in FIG. 5C.

Alternatively, the grinding tool 18 may perform grinding while moving in the direction perpendicular to the relative moving direction of the grinding tool 18 to the blade forming part 12 in accordance with the profile of the cutting edge 7 of the cutting part 6. By this, it is possible to achieve a desired rake angle by adjusting the moving path of the grinding tool 18 while performing the grinding even in the case of using a simple cylindrical grinding tool 18.

Figure 6A:
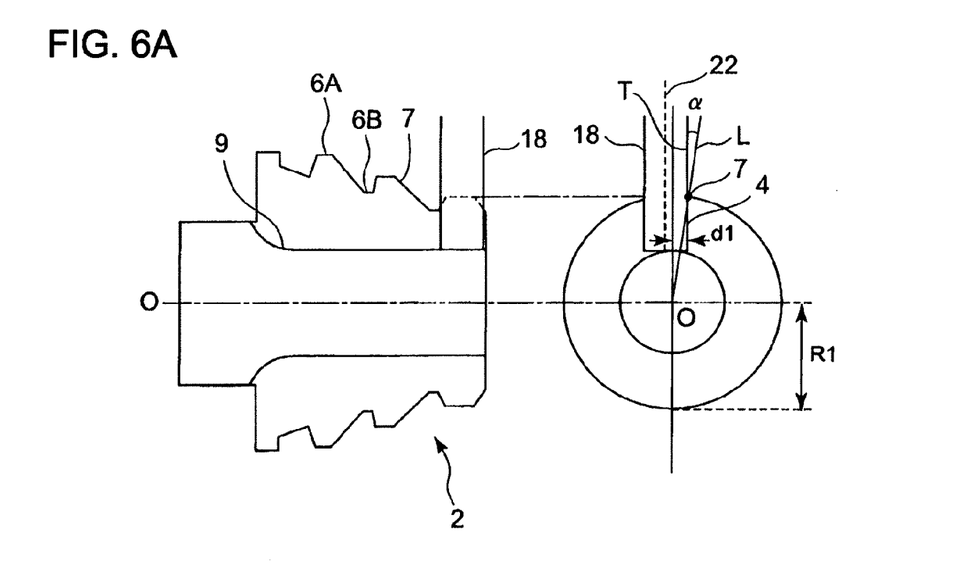
FIG. 6A and FIG. 6B show a cylindrical grinding tool moving in accordance with the profile of the cutting edge to perform grinding.
Figure 6B:
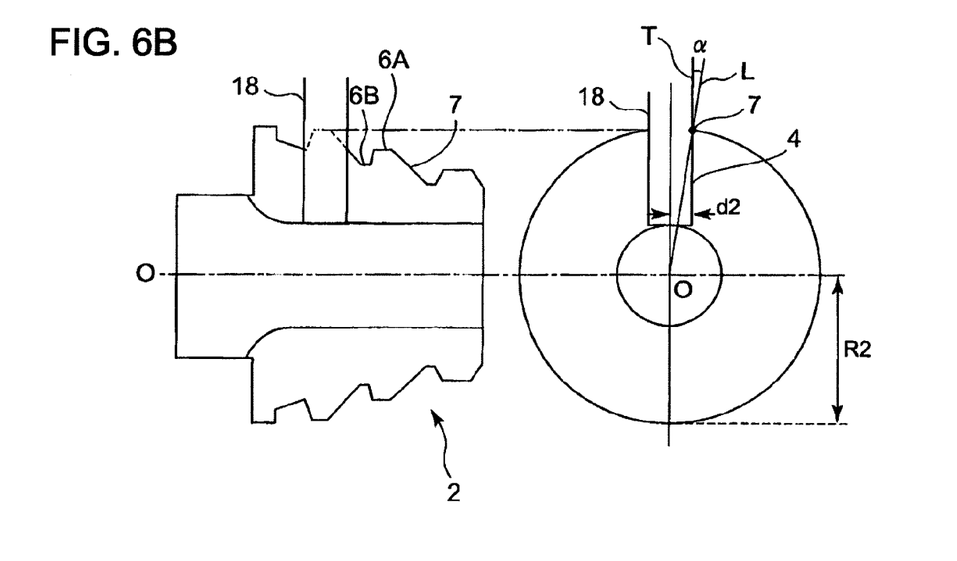

FIG. 6A and FIG. 6B are illustrations to explain how the cylindrical grinding tool 18 is moved in accordance with the profile of the cutting edge 7 to perform grinding. As shown in FIG. 6A and FIG. 6B, the grinding tool 18 is moved (the axial center 22 is displaced) in the direction perpendicular to the relative moving direction of the grinding tool to the blade forming part 12 in accordance with the distance between the cutting edge 7 and the rotation axis O (the profile of the cutting edge 7). This allows the rake angle α at the projection 6A and the depression 6B to be set respectively as desired. By this, the rake angles α at the position with large diameter (the projection 6A) and the at the position with small diameter (the depression 6B) can be arbitrarily set for a variety of formed cutters 1 with different shapes with use of an inexpensive grinding tool 18 that is not particularly formed.

For instance, "d" is a distance between a straight line from the rotation axis O parallel to the rake face 4 and the rake face 4 and "R" is a distance from the rotation axis O to the cutting edge 7 (the radius of the cutting part 2). The grinding tool 18 may be moved based on the distance d set to satisfy the formula 3 below at any position of the cutting part 2. As a result, the rake angles can be set constant regardless of the profile of the cutting edge 7.

$$\sin \alpha \times R = d \quad \text{[FORMULA 3]}$$

However, the angle α is a constant value. For instance, in the case illustrated in FIG. 6A and FIG. 6B, the following relationship should be established to satisfy the formula 3.

$$d1/R1 = d2/R2$$

The invention claimed is:

1. A method for manufacturing a formed cutter having a blade on a tip side of the formed cutter, the blade having a cutting part and a flute alternately disposed and rotating around a rotation axis to perform cutting, said method comprising:
    forming a depression and a projection on a blade forming part, the depression and the projection having different diameters and being arranged in a direction of the rotation axis;
    forming the flute on the blade forming part; and
    forming a rake face on a side wall of the flute by bringing a pencil-shaped grinding tool in line contact with the side wall of the flute along a depth direction of the flute while rotating the pencil-shaped grinding tool around an axial center of the pencil-shaped grinding tool,
    wherein in said forming of the rake face, the pencil-shaped grinding tool is moved relative to the blade forming part along the flute such that the pencil-shaped grinding tool rotates around the axial center of the pencil-shaped grinding tool in line contact with the side wall of the flute,
    and wherein in said forming of the rake face, the pencil-shaped grinding tool is moved in a direction perpendicular to a moving direction of the pencil-shaped grinding tool relative to the blade forming part so as to vary a displacement amount of a position of the axial center of the pencil-shaped grinding tool with respect to a radial direction of the blade forming part in accordance with a profile of a cutting edge of the cutting part.

2. The method for manufacturing the formed cutter according to claim 1,
    wherein the pencil-shaped grinding tool has a cylindrical shape with a constant diameter.

3. The method for manufacturing the formed cutter according to claim 1,
    wherein in said forming of the rake face, the pencil-shaped grinding tool is moved to keep a ratio of d with respect to R constant, where R is a radius of the cutting part and d is a distance between the rake face and a line from the rotation axis parallel to the rake face.

4. The method for manufacturing the formed cutter according to claim 1,
    wherein, in said forming of the flute, the flute is formed by cutting the blade forming part by means of an endmill.

5. The method for manufacturing the formed cutter according to claim 1,
    wherein the flute is a spiral flute twisted with respect to the rotation axis.

6. A method for manufacturing a formed cutter having a blade on a tip side of the formed cutter, the blade having a cutting part and a flute alternately disposed and rotating around a rotation axis to perform cutting, said method comprising:
    forming a depression and a projection on a blade forming part, the depression and the projection having different diameters and being arranged in a direction of the rotation axis;
    forming the flute on the blade forming part; and
    forming a rake face on a side fall of the flute by bringing a pencil-shaped grinding tool in line contact with the side wall of the flute along a depth direction of the flute while rotating the pencil-shaped grinding tool around an axial center of the pencil-shaped grinding tool,
    wherein in said forming of the rake face, the pencil-shaped grinding tool is moved relative to the blade forming part along the flute such that the pencil-shaped grinding tool rotates around the axial center of the pencil-shaped grinding tool in line contact with the side wall of the flute,
    and wherein a cross section of the pencil-shaped grinding tool passing through the axial center has a contour such that, when a reversed shape of the contour is transferred to the side wall of the flute, an angle between a tangent line of the side wall at a point on the side wall and a straight line from the rotation axis to the point on the side wall is constant regardless of a position of the point in the depth direction of the flute.

7. The method for manufacturing the formed cutter according to claim 6, wherein, in said forming of the rake face, the grinding tool is moved in accordance with a profile of a bottom of the flute in a direction perpendicular to a moving direction of the grinding tool relative to the blade forming part.

8. The method for manufacturing the formed cutter according to claim 6,
wherein a base material of the pencil-shaped grinding tool is made of quenched high-speed steel.

9. A method for manufacturing a formed cutter having a blade on a tip side of the formed cutter, the blade having a cutting part and a flute alternately disposed and rotating around a rotation axis to perform cutting, said method comprising:
forming a depression and a projection on a blade forming part, the depression and the projection having different diameters and being arranged in a direction of the rotation axis;
forming the flute on the blade forming part; and
forming a rake face on a side fall of the flute by bringing a pencil-shaped grinding tool in line contact with the side wall of the flute along a depth direction of the flute while rotating the pencil-shaped grinding tool around an axial center of the pencil-shaped grinding tool,
wherein in said forming of the rake face, the pencil-shaped grinding tool is moved relative to the blade forming part along the flute such that the pencil-shaped grinding tool rotates around the axial center of the pencil-shaped grinding tool in line contact with the side wall of the flute,
and wherein a cross section of the pencil-shaped grinding tool passing through the axial center has a contour such that, when a reversed shape of the contour is transferred to the side wall of the flute, an angle between a tangent line of the side wall at a point on the side wall and a straight line from the rotation axis to the point on the side wall becomes smaller from a bottom of the flute toward a cutting edge of the cutting part.

10. The method for manufacturing the formed cutter according to claim 9,
wherein, in said forming of the rake face, the grinding tool is moved in accordance with a profile of a bottom of the flute in a direction perpendicular to a moving direction of the grinding tool relative to the blade forming part.

11. A grinding tool for forming a rake face of a formed cutter having a blade on a tip side of the formed cutter, the blade having a cutting part and a flute alternately disposed and rotating around a rotation axis to perform cutting,
wherein the grinding tool has a pencil shape in which a cross section of the pencil-shaped grinding tool passing through an axial center has a contour such that, when a reversed shape of the contour is transferred to a side wall of the flute, an angle between a tangent line of the side wall at a point on the side wall and a straight line from the rotation axis to the point on the side wall is constant regardless of a position of the point in a depth direction of the flute.

12. The grinding tool according to claim 11,
wherein a base material of the pencil-shaped grinding tool is made of quenched high-speed steel.

13. A grinding tool for forming a rake face of a formed cutter having a blade on a tip side of the formed cutter, the blade having a cutting part and a flute alternately disposed and rotating around a rotation axis to perform cutting,
wherein the grinding tool has a pencil shape in which a cross section of the pencil-shaped grinding tool passing through an axial center has a contour such that, when a reversed shape of the contour is transferred to a side wall of the flute, an angle between a tangent line of the side wall at a point on the side wall and a straight line from the rotation axis to the point on the side wall becomes smaller from a bottom of the flute toward a cutting edge of the cutting part.

14. The grinding tool according to claim 13,
wherein a base material of the pencil-shaped grinding tool is made of quenched high-speed steel.

* * * * *